(12) United States Patent
Birkestrand et al.

(10) Patent No.: US 10,469,564 B2
(45) Date of Patent: Nov. 5, 2019

(54) MANAGEMENT OF UNRETURNED SYSTEM POOL RESOURCES

(71) Applicant: International Business Machines Corporation, Armonk, NY (US)

(72) Inventors: Daniel C. Birkestrand, Rochester, MN (US); Stephanie L. Jensen, Austin, TX (US); Paul F. Olsen, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 392 days.

(21) Appl. No.: 14/160,313

(22) Filed: Jan. 21, 2014

(65) Prior Publication Data
US 2015/0207750 A1    Jul. 23, 2015

(51) Int. Cl.
*H04L 12/911* (2013.01)
*H04L 29/08* (2006.01)
*G06F 9/50* (2006.01)

(52) U.S. Cl.
CPC ............ *H04L 67/10* (2013.01); *G06F 9/5027* (2013.01); *H04L 67/1008* (2013.01)

(58) Field of Classification Search
CPC ...... G06Q 10/06; G06Q 30/04; G06F 9/5083; G06F 9/5077; H04L 47/70
See application file for complete search history.

(56) References Cited

U.S. PATENT DOCUMENTS

| | | | |
|---|---|---|---|
| 8,082,171 B1 | 12/2011 | Whitcomb et al. | |
| 8,275,881 B2 | 9/2012 | Fellenstein et al. | |
| 8,280,790 B2 | 10/2012 | Lappas et al. | |
| 9,306,870 B1* | 4/2016 | Klein | H04L 29/06176 |
| 2002/0120565 A1* | 8/2002 | Yu | G06Q 20/102 705/40 |
| 2005/0010502 A1* | 1/2005 | Birkestrand et al. | 705/34 |
| 2005/0044228 A1* | 2/2005 | Birkestrand et al. | 709/226 |
| 2006/0069621 A1* | 3/2006 | Chang | G06F 9/505 705/26.1 |
| 2008/0300890 A1* | 12/2008 | Dawson | G06Q 30/06 705/1.1 |
| 2011/0078705 A1* | 3/2011 | Maclinovsky | G06F 9/50 719/318 |
| 2012/0179824 A1* | 7/2012 | Jackson | G06F 9/5027 709/226 |
| 2013/0014107 A1* | 1/2013 | Kirchhofer | 718/1 |
| 2014/0219132 A1* | 8/2014 | Delveaux | H04L 12/4035 370/254 |

* cited by examiner

*Primary Examiner* — Normin Abedin
*Assistant Examiner* — Muhammad Raza
(74) *Attorney, Agent, or Firm* — Patterson + Sheridan, LLP (57) ABSTRACT

Techniques are provided for providing computing resources from a pool a plurality of networked computing systems to a consumer. The method includes determining that the consumer's resource usage exceeds a predetermined threshold. After a predetermined period of time, and upon determining that the consumer's resource usage continues to exceed the predetermined threshold, the method identifies one or more computing systems from the pool having capacity to host at least part of the amount of excess resource usage. The method further includes allocating resources on one or more computing systems selected from the identified computing systems to satisfy the amount of excess resource usage, and transferring at least the amount of excess resource usage to the selected one or more computing systems.

14 Claims, 8 Drawing Sheets

MANAGEMENT OF UNRETURNED SYSTEM POOL RESOURCES

BACKGROUND

Embodiments presented in this disclosure generally relate to the management of pooled resources for networked computing systems, and more specifically, to allocating pooled resources for a consumer's excess resource usage based on costs of one or more types of on-demand resources.

Computing systems typically ship to consumers with only a limited amount of computing resources (for example, memory and processors) available for the consumer's use. For networked computing systems, however, the demands for these computing resources may vary greatly over time. During off-peak times, much of a computing system's resources may sit idle, while during peak times, the system's capacity may be inadequate to meet the peak demands.

In distributed computing systems, computing resources (such as memory and processors) may be physically located within a particular computing system, but the resources may be distributed and shared among the other networked computing systems. Distributed computing systems provide significant flexibility to consumers; where a consumer might formerly have purchased a relatively expensive computing system to be able to meet anticipated peak demands on the system, the consumer may now purchase computing resources for a period of time that are sufficient to meet the demands.

SUMMARY

Embodiments of the invention generally relate to a method for providing computing resources from a pool a plurality of networked computing systems to a consumer. The method includes determining that the consumer's resource usage exceeds a predetermined threshold. After a predetermined period of time, and upon determining that the consumer's resource usage continues to exceed the predetermined threshold, the method identifies one or more computing systems from the pool having capacity to host at least part of the portion of the resource usage that exceeds the predetermined threshold. The method includes allocating resources on one or more computing systems selected from the identified computing systems, to satisfy the portion of the resource usage that exceeds the predetermined threshold, and transferring at least the portion of the resource usage that exceeds the predetermined threshold to the selected one or more computing systems.

Another embodiment relates to a control arrangement for managing computing resources in a pool of a plurality of computing systems. The control arrangement includes one or more controllers comprising a processor. The control arrangement further includes a memory containing a program, which when executed by the processor, performs an operation that includes determining that the consumer's resource usage exceeds a predetermined threshold. After a predetermined period of time, and upon determining that the consumer's resource usage continues to exceed the predetermined threshold, the operation identifies one or more computing systems from the pool having capacity to host at least part of the portion of the resource usage that exceeds the predetermined threshold. The operation includes allocating resources on one or more computing systems selected from the identified computing systems, to satisfy the portion of the resource usage that exceeds the predetermined threshold, and transferring at least the portion of the resource usage that exceeds the predetermined threshold to the selected one or more computing systems.

Another embodiment relates to a system that includes a pool of one or more networked computing systems, where each computing system is configured to provide computing resources to a consumer. The system also includes a controller comprising a processor. The controller is configured to determine that the consumer's resource usage exceeds a predetermined threshold. The controller is further configured to, after a predetermined period of time and upon determining that the consumer's resource usage continues to exceed the predetermined threshold, identify one or more computing systems from the pool having capacity to host at least part of the portion of the resource usage that exceeds the predetermined threshold. The controller is further configured to allocate resources on one or more computing systems selected from the identified computing systems, to satisfy the portion of the resource usage that exceeds the predetermined threshold, and transfer at least the portion of the resource usage that exceeds the predetermined threshold to the selected one or more computing systems.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings.

Note, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention provide techniques for managing pooled computing resources in a distributed system, providing resources from one or more computing systems in the system pool to a consumer based on the consumer's resource usage and/or resource requirements.

Note that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
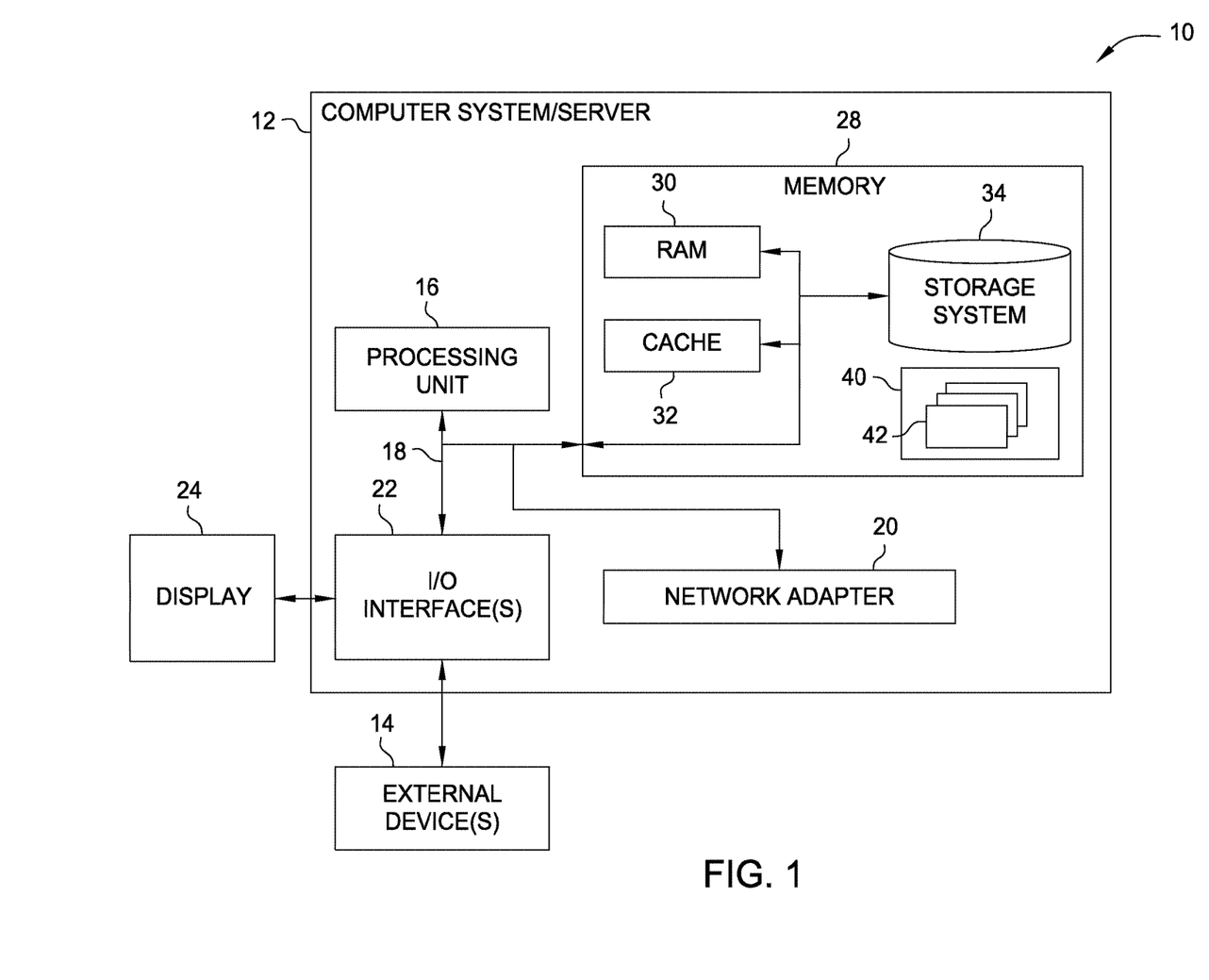
FIG. 1 illustrates a cloud computing node, according to one embodiment of the invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
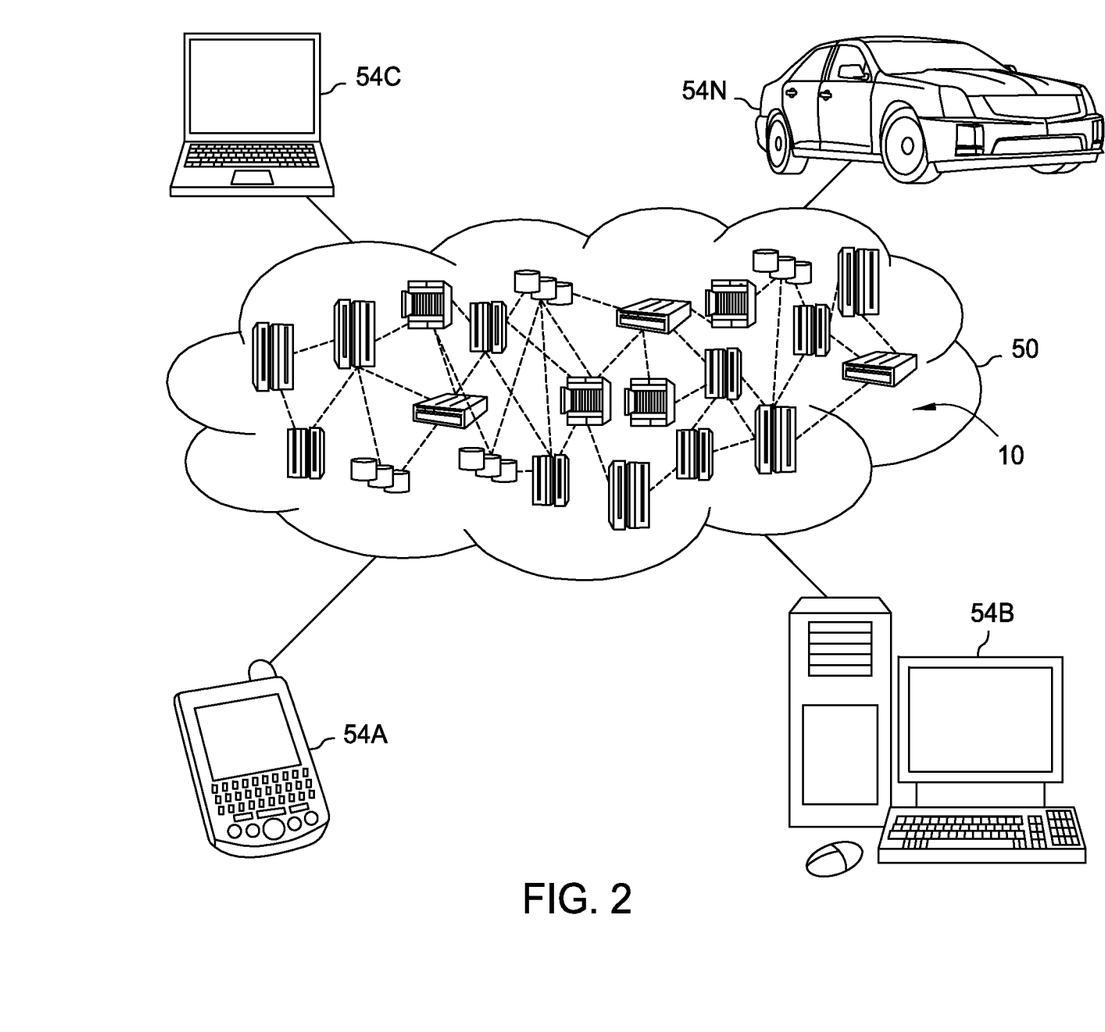
FIG. 2 illustrates a cloud computing environment, according to one embodiment of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
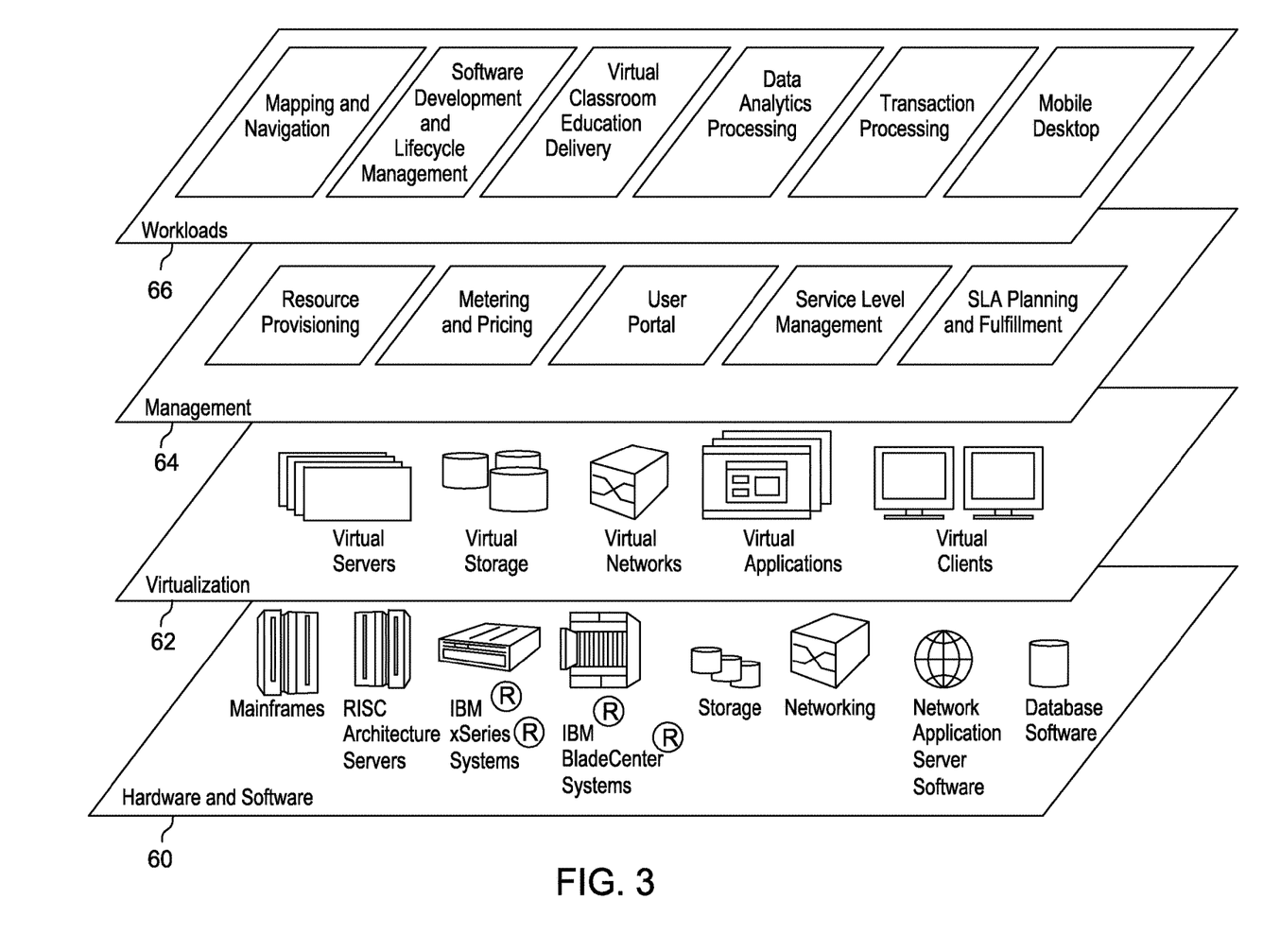
FIG. 3 illustrates abstraction model layers, according to one embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Embodiments of the invention are specifically contemplated to include one or more functions of the management layer, such as resource provisioning to consumers, and metering and pricing of resources.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

A distributed system, as described herein, may include a data center comprising one or more servers. A server may be unallocated, that is, functioning independently of other servers within the distributed system. Alternately, a server may be allocated to a system pool within the data center. A system pool is a group of servers that may function collaboratively to provide computing resources to workloads. For example, a system pool of the data center may be configured to accomplish a set of specialized data collection tasks within the distributed system. In another example, a system pool may include specialized hardware.

A workload may be assigned to either an unallocated server or an allocated server. A workload administrator may opt to migrate a workload from a source server to a target server for various reasons. For instance, a particular workload may require specific or additional resources not provided by the source server. Accordingly, the workload administrator may migrate the workload from the source server to a target server capable of providing the specific or additional resources.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources (as well as embodiments of the invention) may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In the context of the present invention, workloads of an unallocated server or a server allocated to a system pool may be deployed to a computing cloud (where the cloud itself is provided by the enterprise or a third party). Moreover, cloud-based database systems, virtual machines, and a variety of other server applications may be used to manage workloads of an unallocated server or an allocated server.

Figure 4:
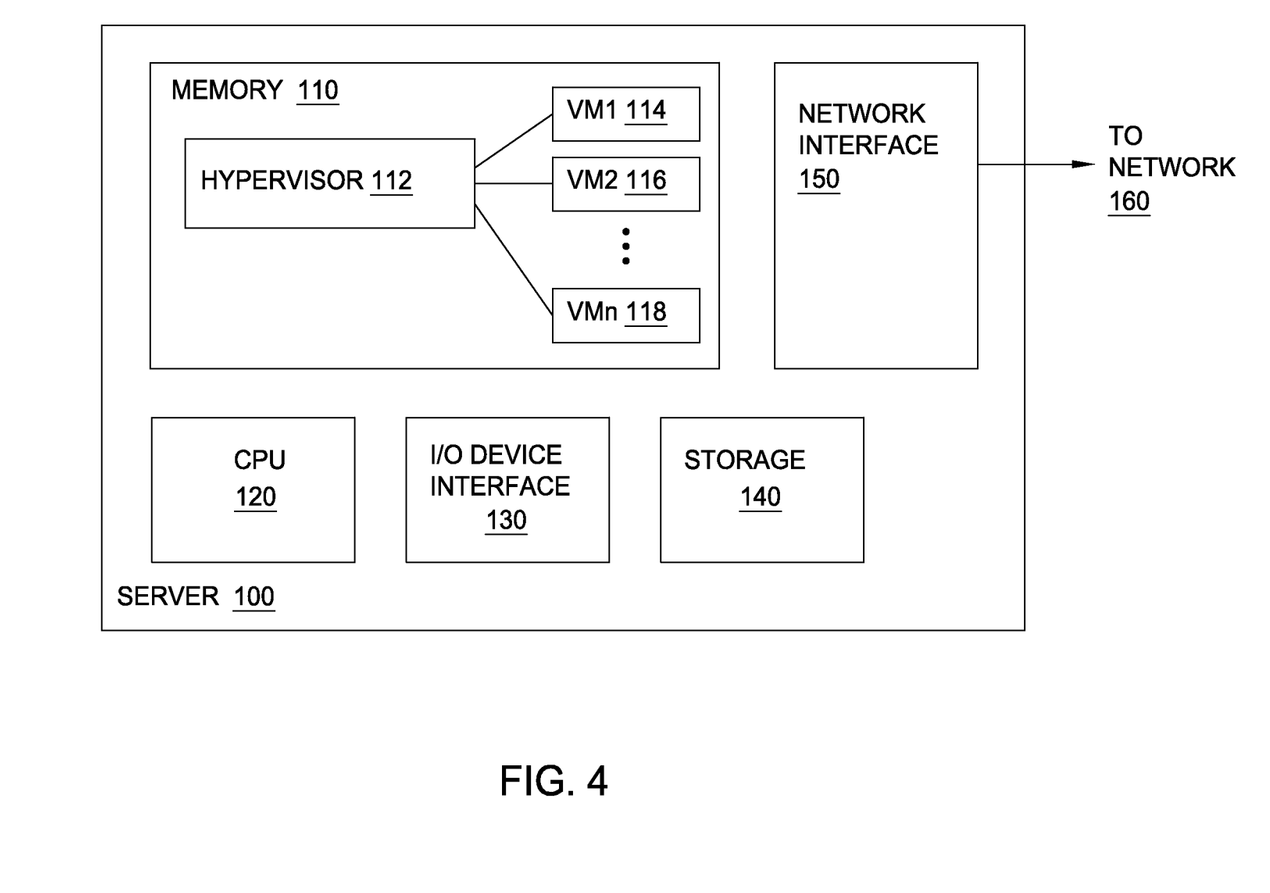
FIG. 4 illustrates a server, according to one embodiment of the invention.

FIG. 4 illustrates a server 100, according to an embodiment described herein. The server may generally have the same or similar structure and function as that of computer system/server 12, described above with respect to FIG. 1. Server 100 may include a memory 110 and a central processing unit (CPU) 120. The memory may include one or more virtual machines (VM 1, VM 2, . . . VM n) 114, 116, 118, and a hypervisor 112 configured to launch and manage the virtual machines. The hypervisor may be configured to intercept system calls made by a virtual machine (guest) operating system, and may also manage executing instruction streams on the CPU.

Server 100 may further include an input/output (I/O) device interface 130 for interacting with one or more I/O devices. The server may also include storage 140, and a network interface 150 for handling communication to and from network 160.

Figure 5:
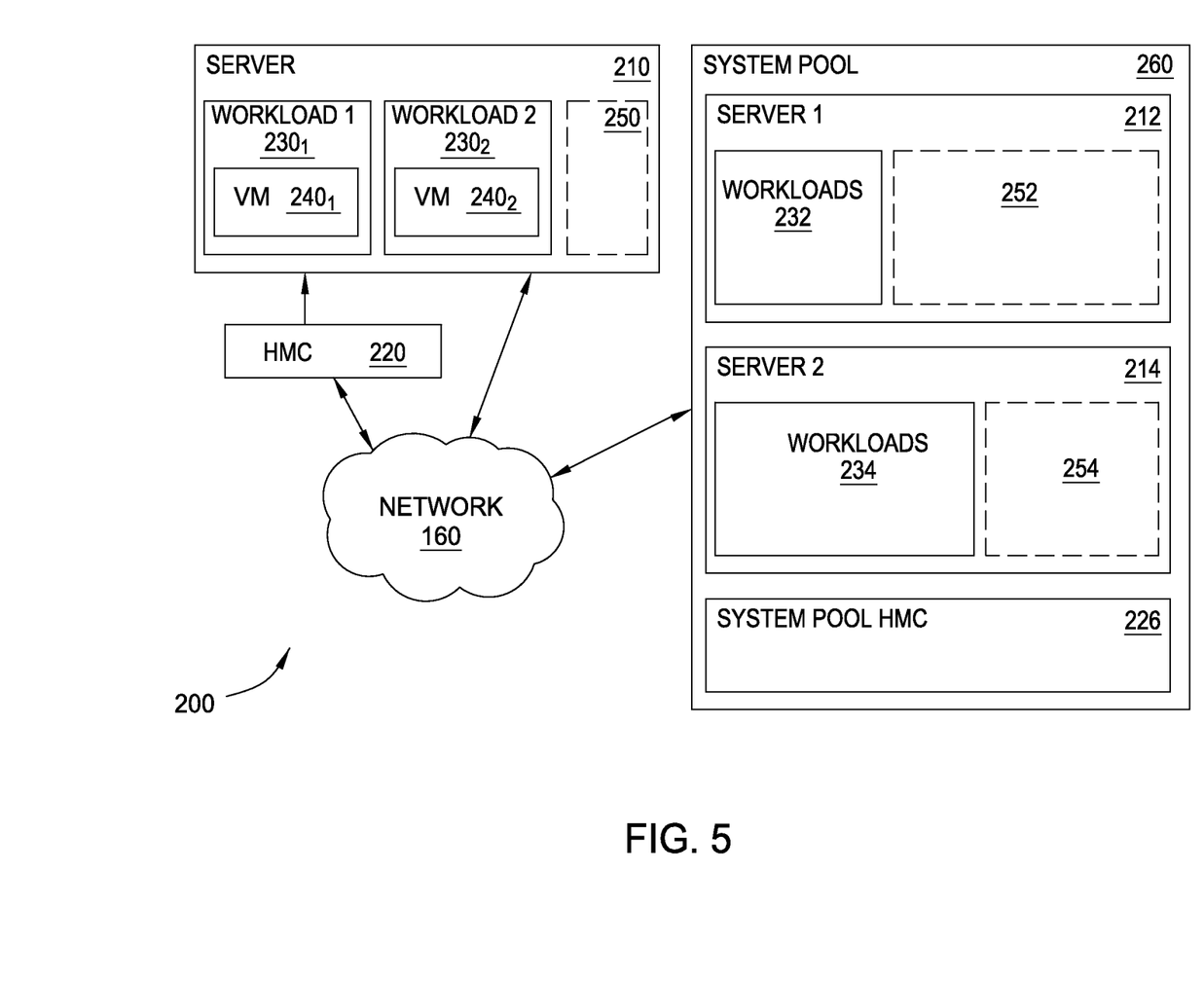
FIG. 5 illustrates a distributed computing environment including an unallocated server and a system pool, according to one embodiment of the invention.

FIG. 5 illustrates a distributed computing environment, according to an embodiment described herein. As shown, the distributed computing environment 200 includes an unallocated server 210. The unallocated server may be configured and may generally operate in the same manner as server 100, described above. Although shown as a single unallocated server, unallocated server 210 is intended to be representative of a single unallocated server or multiple unallocated servers. The unallocated server may include one or more workloads $230_1$, $230_2$. Each workload may include a virtual machine $240_1$, $240_2$. Although shown as a single virtual machine, each virtual machine is intended to be representative of a single virtual machine or multiple virtual machines.

The distributed computing environment may also include a hardware management console (HMC) 220 configured to provide management functions for the unallocated server and its workloads. Although shown as a single console, HMC 220 may represent multiple HMCs. The HMC(s) may each provide management functions to a single server or to multiple servers, and may be communicatively coupled to the servers and to other HMC(s) directly or through the network.

Further, the distributed computing environment may include a system pool 260. The system pool may be connected to the unallocated server, and may be connected to other computing systems in the distributed computing environment, through network 160. Although shown as a single system pool, system pool 260 is intended to be representative of a single system pool or multiple system pools. Illustratively, system pool 260 may include a plurality of servers 212, 214 allocated thereto. Each allocated server may include components similar to those described above with respect to unallocated server 210. For example, server 1 212 includes one or more workloads 232. Server 1 is depicted as having capacity 252 available to handle one or more additional workloads. Likewise, server 2 includes one or more workloads 234, but is depicted as having less available capacity 254 than server 1. Further, the system pool may include a system pool HMC 226 configured to provide coordinated management functions for the servers allocated to the system pool. Although shown as a part of the system pool and distinct from HMC 220, in an alternate embodiment the functionality of the system pool HMC may be included in HMC 220, such that a single HMC may provide the management functions for both unallocated servers and servers allocated to the system pool.

Computing resources, whether hardware-based (such as memory, processors, or storage) or software, may be provided as capacity on demand within the distributed computing system. Capacity on demand provides a convenient mechanism for licensing hardware and/or software to consumers. For example, a consumer may select a desired type and amount of additional resources and may "purchase" the resources by purchasing a corresponding activation code from the resource provider. When the activation code is entered into the managing controller (such as a HMC or hypervisor), the consumer may then access and use these additional resources.

Capacity on demand may be provided to a particular computing system by enabling resources physically installed within the system, by sharing resources from other computing systems within the network, or by combinations thereof. For example, a server may be shipped to a consumer with a particular amount of memory and number of processors physically installed, but the consumer may not be able to access all of the installed memory and/or processors unless they are also enabled for use by the vendor. The server may also be capable of using resources provided by other computing devices within the system pool.

Resource providers may license capacity on demand to consumers according to various cost schemes. While several example cost schemes are provided below and illustrated in the figures, embodiments of the invention may be implemented using any feasible cost function or scheme. Likewise, the consumer's resource usage may be recorded or documented using any feasible means; for example, a particular server's hypervisor may log an amount of time and amount and type of resources used by the consumer. For monitoring and billing purposes, the information reflecting the consumer's resource usage may be transmitted to the resource provider using any feasible means, whether done automatically by the computing system or whether additional consumer activity is required (i.e., the consumer submits billing data to the resource provider).

For example, a "trial" cost scheme may offer a fixed number of processors and/or amount of memory for a predetermined amount of time at no cost to the consumer; by using this scheme, a consumer may be able to determine how many resources should be purchased to meet the consumer's computing needs.

Other schemes may include an "on/off" cost scheme, in which a consumer purchases an activation code corresponding to a predetermined number of "resource-days," and the resource provider may bill for resource usage incrementally or as the consumer uses the resources. While the example of "resource-days" is provided here, any other measure of resource usage (whether time-based or time-independent) may be used with such a scheme.

Under a "utility" cost scheme, a consumer may specify an amount of resources to remain ready for use when the computing system reaches a particular use threshold. Upon reaching the system use threshold (e.g., during a peak demand period), the additional resources are enabled to help the computing system handle the additional demand. In one example, the consumer may incur costs only when the additional resources are enabled; alternately, the resource provider may also charge for ensuring resource availability to the consumer.

A "metered" scheme may operate in a generally similar manner to the utility scheme, but differs in that a consumer may be required to pre-pay for the desired resource usage. Consequently, the user would be not billed for the purchased resources after usage.

As can be seen in the examples described above, many cost schemes may be applied to predetermined, finite amounts of resources and time. One consequence of applying these types of cost schemes is that transition periods arise as the limits of one cost scheme are reached, and where the consumer may be required to switch to another cost scheme. For example, a consumer may use up all the resource capacity available at no cost under a "trial" scheme, and thus any further resource usage by the consumer will have another cost scheme applied.

Even though a consumer's resource usage may exceed the predefined limits of a current cost scheme, for various reasons the transition to a new cost scheme may not be automatic and seamless, and may normally require activity from the consumer and/or the resource provider. For example, a contractual agreement may exist between the consumer and the resource provider, requiring any future changes to the cost schemes to be reviewed and further agreed to; such a contractual agreement might further specify continuation of the current scheme (or application of a temporary cost scheme) until a new cost scheme is agreed to.

A resource provider's own policies may also regulate the application of cost schemes during the transition period. For example, even absent a contractual agreement as described above, for goodwill considerations a resource provider may have a resource continuity policy that requires continuation of the current cost scheme until a new cost scheme is agreed to. And as the termination or interruption of resources may foreseeably cause monetary damages to a consumer in some instances, the resource provider may have a legal policy in place to ensure continued service to the consumer during the transition period. For example, the consumer may be a company that sells goods via their website, and has purchased capacity on demand server resources in anticipation of a peak holiday buying period; even if the peak demands exceed the amount of additional resources purchased, an interruption or termination of resources by the resource provider may cause a loss of potential sales and profits for the consumer, which may in turn give rise to liability of the resource provider.

Whether included as part of a particular policy or independent of any policy, the resource provider may provide a grace period, during which the consumer may continue to use an amount of resources exceeding the predefined limits of the current cost scheme. The grace period may be for a predetermined amount of time, during which time the consumer may be expected to bring their resource usage back into compliance with the limits of the cost scheme.

Grace periods may be particularly advantageous for the migration of logical partitions between computing systems, as the target server may be required to match the number of processors and amount of memory of the source server in order to keep the partition running during the migration. Under the current cost scheme, the consumer may not have adequate resources to simultaneously support the source server and the target server, and acquiring additional resources to support the migration may exceed the limits of the current cost scheme. However, the additional resource need in this case is relatively temporary; once the partition has been successfully migrated to the target server, the corresponding amount of resources on the source server may be freed as they are no longer needed to run the partition. Thus, the consumer's resource usage may return to within the limits of the current cost scheme following the temporary excursion necessary to support the migration.

In the case of pooled resources in distributed systems, there is a direct relationship (typically in a 1:1 ratio) between the amount of resources used by or allocated to a particular computing system, and the amount of pooled resources that are unavailable for use by other computing systems (i.e., the resources are taken out of the pool). Thus, resources that remain allocated to a particular computing system will impact the flexibility and responsiveness of the distributed system as a whole. For example, particular types of resources may be unavailable for use by other computing systems, or the resources may be in insufficient quantities to support the desired operations. It is therefore advantageous for a resource provider to be able to recapture the pooled resources of its distributed system, consistent with contractual agreements, policies, and grace periods.

Though resource providers may be constrained to continue providing resources to a consumer according to the contractual agreements, policies, and grace periods described above, a resource provider may still possess means to enforce the agreed resource limits of the cost scheme. For example, assume a consumer temporarily exceeded the resource limits of their current cost scheme while completing a logical partition migration to a target server, but failed to return those excess resources within the grace period after the migration was completed. The excess resources thus remain unavailable to the pool, and unavailable to other computing systems. While the resource provider may be constrained by agreement or policy to allow the consumer to continue using those currently allocated resources, especially so as not to interfere with the consumer's currently running logical partition, the resource provider may prevent the consumer from allocating additional pool resources until the consumer returns to compliance with the limits of the cost scheme. The out-of-compliance consumer may not be able to complete a new migration until the consumer returns the earlier excess resources to the pool, thus returning to an in-compliance status.

To provide a more seamless transition between cost schemes, and thus to ensure better availability and the more efficient usage of pooled resources, control entities operating within the distributed system may be configured to automatically select and apply a particular cost scheme during transition periods from a current cost scheme, in accordance with any constraints or restraints (e.g., agreements, policies, and grace periods) as described above. For example, automatic selection and application of a cost scheme during a transition period may require an agreement to exist between the consumer and the resource provider. Transition periods may generally arise upon the expiration of a predetermined amount of time for the current cost scheme, or due to the consumer's resource usage exceeding predetermined limits of the current cost scheme.

According to embodiments described herein, control and management functions may be provided by one or more HMCs corresponding to the individual computing systems that are pooled to provide computing resources to the distributed system, one or more HMCs corresponding to the consumer's computing system(s), one or more HMCs managing other systems included in the distributed system but that do not provide computing resources to the system pool, or one or more hypervisors within any of these computing systems. It is also specifically contemplated that the control and management functionality may be provided through a combination of any of the preceding elements. For simplicity and consistency of description, the HMCs and/or hypervisors (or combinations thereof) providing the control and management functions to the distributed system, as described above, are collectively referred to as a "resource manager."

In providing capacity on demand to consumers using pooled resources, having a degree of centralized control using one or more HMCs at the system pool (or distributed system) level may be advantageous. While each individual server allocated to the system pool may have a hypervisor and/or a HMC capable of quickly assessing the status and availability of its local resources, it is unlikely that each individual server's control could as easily assess the availability of the aggregated pooled resources. The coordinated management of pooled resources between individual servers is therefore a relatively complex interaction, when compared to providing a centralized controller at the system pool (or higher) level.

Figure 6:
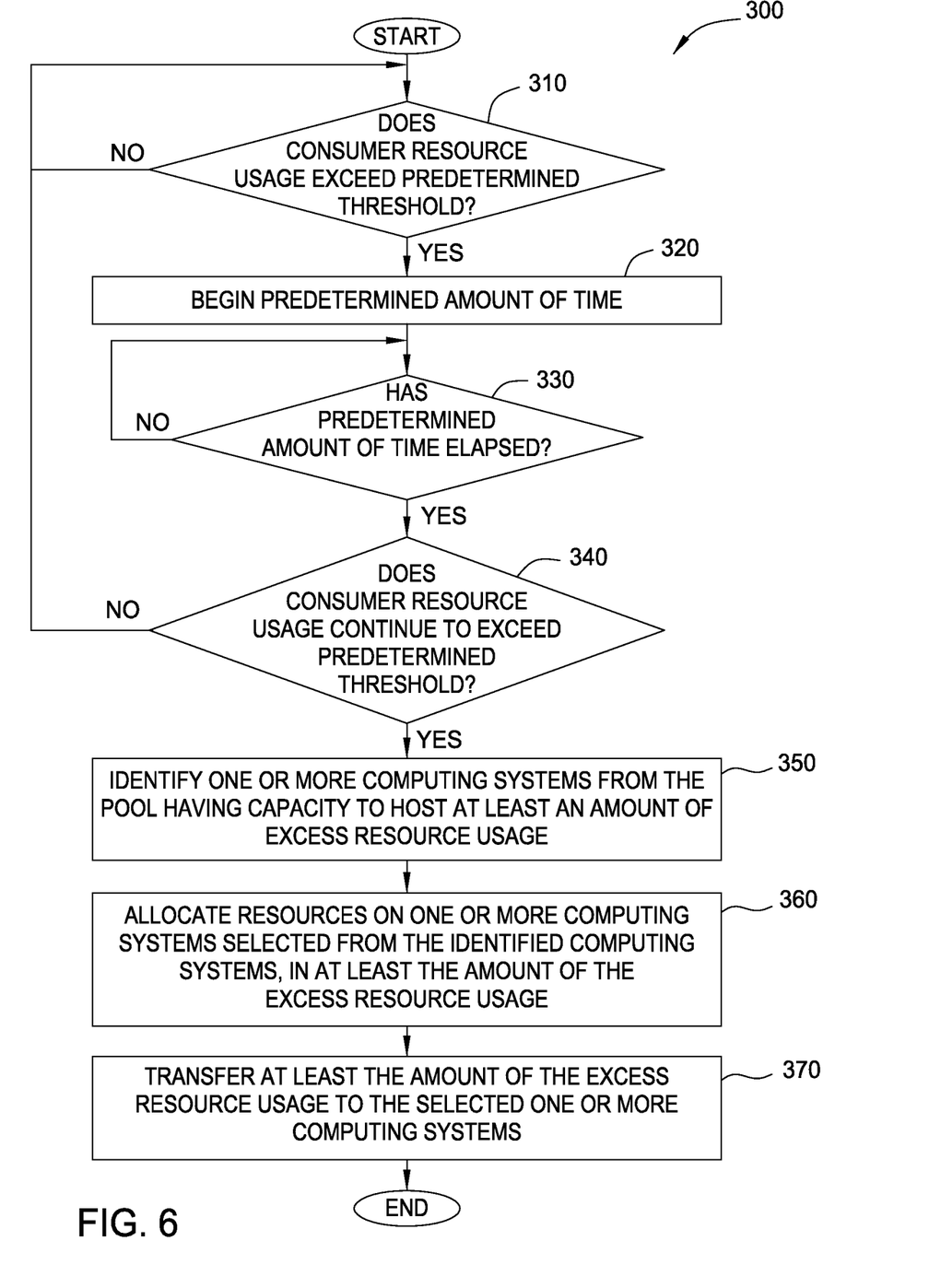
FIG. 6 illustrates a method of providing computing resources from a pool of a plurality of computing systems to a consumer, according to one embodiment of the invention.

FIG. 6 illustrates a method for providing pooled computing resources to a consumer, according to embodiments described herein. Each of the elements of method 300 may generally be performed or coordinated by a resource manager, or by components thereof. The method 300 begins at block 310 and determines whether the consumer's resource usage exceeds a predetermined threshold. As described above, the predetermined threshold may be a resource limit defined by the current cost scheme. If the consumer's resource usage is less than the predetermined threshold (i.e., within the limits set forth by the current cost scheme), the method returns to block 310. However, if the consumer's resource usage exceeds the predetermined threshold, the method proceeds to block 320, where the method may wait for a predetermined period of time to lapse (i.e., a grace period specified by the resource provider, as described above). Alternately, if no grace period is specified for the method, the method may proceed directly from block 310 to block 350. The method begins the time count at block 320 and proceeds to block 330, where the method determines whether the predetermined amount of time has elapsed.

Upon reaching the end of the predetermined period of time, the method proceeds to block 340 and determines whether the consumer's resource usage continues to exceed the predetermined threshold. If the resource usage does not exceed the threshold, the method may reset the time count and return to block 310. In other words, if the consumer has returned to compliance with the cost scheme by reducing resource usage to within the cost scheme limits, the method may end the time count related to the current grace period, and may begin a new grace period (i.e., the entire amount of time) if the consumer's resource usage later exceeds the threshold. However, if the resource usage exceeds the threshold, the method proceeds to block 350.

Alternately, instead of determining whether the consumer's resource usage exceeds the predetermined threshold only at discrete points before beginning the time count and after the lapse of the predetermined amount of time (corresponding to blocks 310 and 340), the method may monitor the consumer's resource usage continuously or periodically. If the resource usage is monitored in this way, when the method determines (at any time) that the resource usage no longer exceeds the threshold, the method may reset the time count and return to block 310 as described above.

At block 350, the method may identify one or more computing systems allocated to the system pool that have sufficient resource capacity (both in type of capacity and amount) to host at least the amount of excess resource usage by the consumer. The method may identify individual computing systems having sufficient resources to independently host the amount of excess resource usage, and additionally may identify suitable combinations of computing systems. For example, the consumer may have an excess usage of three processor-days, a first allocated (i.e., belonging to the system pool) server may have four processor-days available, and a second allocated server may have only one processor-day available. As four processor-days is greater than the excess usage amount of three processor-days, the method may identify the first server as a suitable target server, but may not identify the second server (having only one processor-day) as suitable. However, the method may also identify the combination of the first server and second server as suitable, as their summed capacity (five processor-days) is greater than the excess usage amount.

In determining the type of capacity available, the method may further consider the cost schemes corresponding to the available capacity. For example, the consumer may have an excess usage of three processor-days of "on/off" capacity, and a first allocated server has four processor-days of "on/off" capacity available and a second allocated server has four processor-days of "utility" capacity available. In one embodiment, the method may identify the first server as a suitable target server, and may not identify the second server (having "sufficient" capacity, but of a different type) as suitable. In an alternate embodiment, the method may identify both the first and second servers, and may consider as one selection factor the cost of capacity on each of the identified servers based on their respective cost schemes (described more fully below).

In determining available capacity, the method may also consider converting existing resource capacity to a type suitable to satisfy the excess resource usage. By altering the designation of the capacity, the method may be able to identify more advantageous computing systems capable of hosting the excess resource usage, and may permit a resource provider to recover more of the cost of the capacity used by the consumer.

In an alternate embodiment, the method may identify one or more computing systems from the pool that have capacity to host any amount of the consumer's excess resource usage, regardless of whether the one or more computing systems are capable of hosting the entire amount, individually or in combination. The method may substitute this operation for that of block 350, or this operation may follow block 350 after determining that the entire amount of the excess resource usage cannot be hosted by the identified computing system(s). After selecting computing systems and allocating resources for hosting any amount of the excess resource usage, in a manner similar to that described below with respect to block 360, the method returns to block 340, where the method determines if the consumer's resource usage continues to exceed the predetermined threshold. In this way, the method may iteratively allocate resources (typically as they become available) to satisfy the amount of excess resource usage.

At block 360, the method may allocate resources on one or more computing systems selected from the identified computing systems, in at least the amount of the excess resource usage. The method may select the computing systems according to one or more factors, or weighted combinations of factors. For example, the method may select a computing system based on whether the cost scheme of the available capacity of the computing system can provide an exact match for the consumer's excess usage; alternately, a value may be calculated to indicate a degree of closeness of matching for the identified computing systems, and the method may select a computing system based on this calculated value. In one embodiment, a consumer may provide input to the selection of the one or more computing systems. For example, a consumer may specify factors or combinations of factors to be considered, or the consumer may specify how to weight each of the factors, which may in turn affect the calculated value. The consumer may also specify a preference for selecting a particular system or systems, or may direct the resource manager to not select a particular system or systems.

Another factor may include a measure of disruption to the consumer. For a particular computing system or systems, a lesser value of disruption to the consumer is generally preferable for selection. And conversely, a measure of disruption to the consumer may generally reflect an estimate of performance of the identified computing system (or identified combination of systems) for handling at least the consumer's excess resource usage.

For example, disruption to the consumer may be increased by splitting the consumer's resource allocation across multiple computing systems within the system pool, when compared with fulfilling the resource allocation within a single computing system. Disruption may reflect reduced performance due to physical characteristics of the computing systems and the interconnection of the systems, such as latency or available bandwidth, and may further reflect a measure of computational overhead (i.e., any computing required to effectively coordinate or execute actions between the different computing systems in fulfilling the consumer's resource allocation). Accordingly, disruption to a consumer may ordinarily be increased by selecting computing systems located at a greater distance (i.e., having a lesser geographic or network proximity) from the current system(s). Converting existing resource capacity to another type of capacity may generally mitigate disruption to the consumer, as computing systems having various types of capacity may be selected specifically to reduce the value of disruption (e.g., select specific systems based on their distance from the current system(s), and convert available resource capacity to a suitable type).

Still further, to improve performance of the computing systems, the method may specify a preference for resource allocations to be fulfilled using computing systems as proximate as possible to the system or systems hosting the current allocation. This proximity may include a geographic proximity, network proximity, or another measure of proximity. For example, if a current logical partition has several processors allocated from a particular computing system, the method may preferentially select memory from the same computing system; if insufficient memory is available at the same computing system, the method may determine which other computing system having sufficient memory is in closest proximity to the system hosting the logical partition.

Another factor may include a measure of disruption to resource availability for one or more other consumers who are also using the system pool. Beyond the considerations discussed above with respect to disruption to the consumer, disruption to other consumers may also consider the other consumers' usage, including their current cost schemes (whether purchased or in a transition state) and their utilization of allocated resources (which may consider historical usage data for the other consumers, or may project trends based on this data). For a particular computing system or systems, disruption to other consumers may be measured by individual consumer or collectively across multiple consumers, and the measured value(s) may be compared with a threshold value. In one embodiment, the threshold value could indicate an individually or collectively unacceptable level of disruption to other consumers, and the method may not select the particular computing system(s) whose measure of disruption to other consumers exceeded this threshold value.

At block 370, the method may transfer at least the amount of the consumer's excess resource usage to the selected computing system(s). The method ends following completion of block 370.

As discussed above, in conjunction with the selection of a computing system (or combination of systems) for hosting a consumer's excess resource usage, such as the selection described in block 360 of method 300 described above, cost values may be determined for the different types of capacity available from the identified computing systems.

Figure 7A:
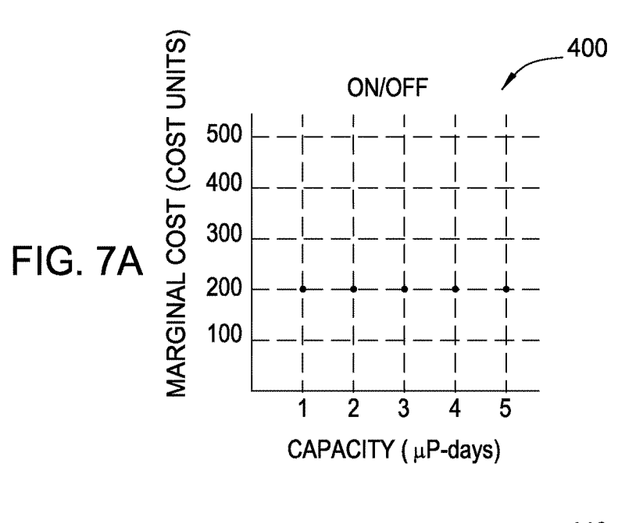
FIGS. 7A-7E illustrate examples of costs for processor capacity according to different cost schemes, where the different cost schemes represent different types of capacity available for selection, according to one embodiment of the invention.
Figure 7B:
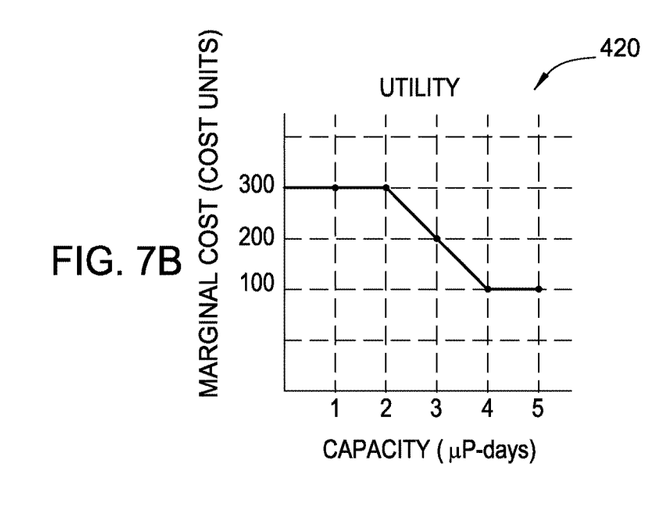
Figure 7C:
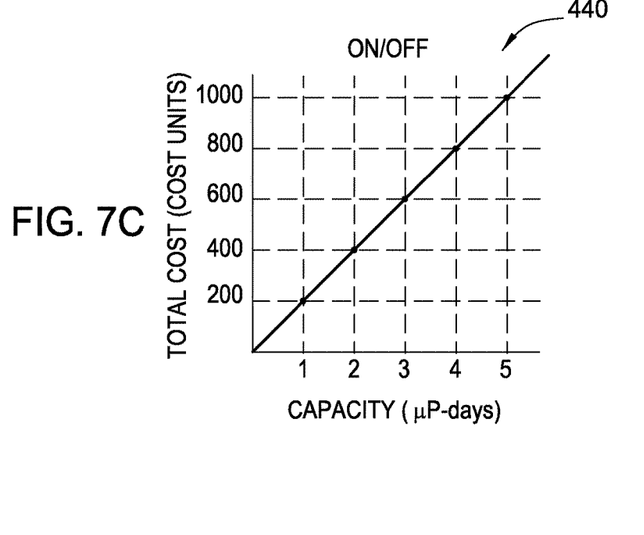
Figure 7D:
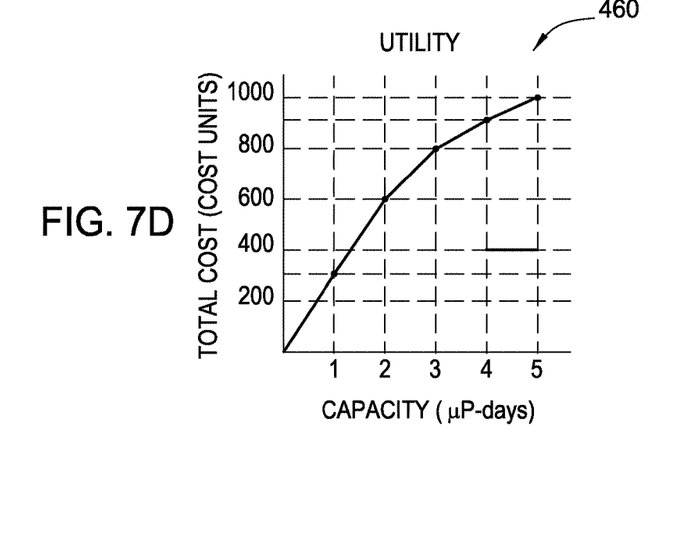

FIGS. 7A and 7B each illustrate an example of marginal costs for processor capacity according to different cost schemes, where the different cost schemes represent different types of capacity available for selection, according to an embodiment described herein. The different types of capacity may be provided by different computing systems, or could be available on a single computing system. FIGS. 7C and 7D illustrate the total costs for processor capacity corresponding to FIGS. 7A and 7B, respectively. Note that while particular marginal cost functions have been selected for demonstration in the figures, these examples are not to be construed as limiting the scope of the invention in any way, as any feasible cost function(s) may be used in connection with performing the techniques described herein.

Graph 400 depicts marginal cost values corresponding to one possible "on/off" cost scheme, according to the current example. In this example, the marginal cost for capacity is constant; that is, one unit of capacity (microprocessor-days, or "µP-days") corresponds to 200 cost units, regardless of the total amount of capacity required.

Graph 420 depicts marginal cost values corresponding to one possible "utility" cost scheme, according to the current example. In this example, the marginal cost for capacity tends to decrease with increased capacity; the first two units of capacity (µP-days) each correspond to 300 cost units, with successive units of capacity generally corresponding to fewer cost units. The marginal cost remains at 100 cost units for both four and five units of capacity. Note that the same units of capacity have been selected for the examples of graphs 400 and 420 for ease of description and understanding; even though cost schemes may specify differing units of capacity, such cost schemes may still be compared according to the techniques described herein. Note further that the respective capacities for the different cost schemes have been treated equally to simplify calculations in this example; however, a particular capacity value under one cost scheme in many cases will not equate to the same amount of resources provided as the same capacity value as calculated another cost scheme (e.g., 1 µP-day of "utility" may not equate to 1 µP-day of "on/off").

Graph 440 depicts total cost values corresponding to the marginal cost values depicted in graph 400. Thus, as each unit of capacity (µP-days) depicted in graph 400 has a constant cost of 200 cost units, the total costs depicted in graph 440 will increase by 200 cost units per unit of capacity (i.e., one µP-day capacity=200 cost units, two µP-days capacity=400 cost units, etc.).

Likewise, graph 460 depicts total cost values corresponding to the marginal cost values depicted in graph 420. As the marginal costs depicted in graph 420 tend to decrease with increased capacity (though not at a constant rate), the total costs depicted in graph 440 will continue to increase, but at a slowing rate. As shown, the total costs are 300 cost units for one µP-day capacity, 600 cost units for two µP-days capacity, 800 cost units for three µP-days capacity, 900 cost units for four µP-days capacity, and 1000 cost units for five µP-days capacity.

A particular computing system or systems may be selected to provide capacity to a consumer based on a comparison of multiple cost functions and values, such as the two cost schemes described above with respect to FIGS. 7A-7D. A resource manager or other controller may compare the cost functions corresponding to available capacity, and may specifically consider the amount of excess resource usage, when selecting a computing system or systems to provide pooled resources to the consumer. Note that while the following example compares two cost schemes related to one type of resource (processor capacity), any number of cost schemes may be considered, as well as any number of different computing resources, when selecting a computing system or systems to provide pooled resources to the consumer.

Figure 7E:
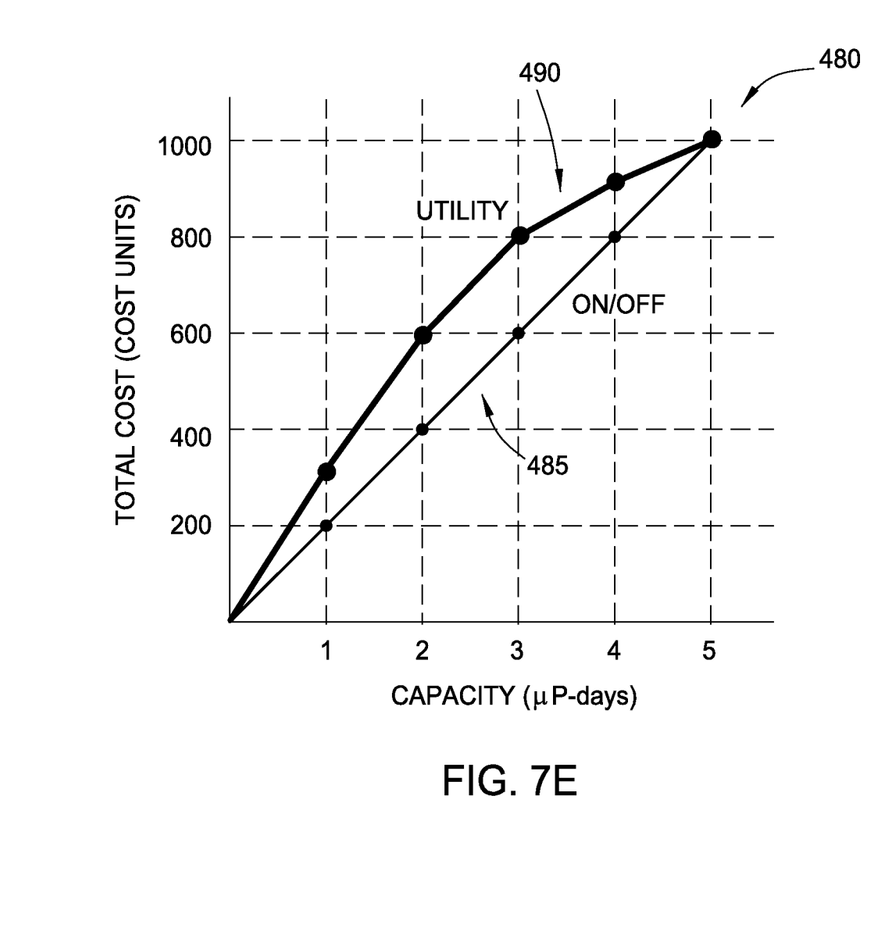

FIG. 7E illustrates the total costs for processor capacity as depicted by FIGS. 7C and 7D, with graph 480 combining graphs 440 and 460 for ease of comparison. The total costs corresponding to the "on/off" cost scheme is displayed as the thin line 485, while the total corresponding to the "utility" cost scheme is displayed as the thick line 490. For example, three µP-days capacity would cost 600 cost units according to the "on/off" cost scheme, or 800 cost units according to the "utility" cost scheme.

In addition to considering the cost values generally, the resource manager may consider one or more billing policies when selecting a computing system or systems to provide pooled resources to a consumer. Billing policies may be selected and applied unilaterally by the resource provider, or may be based on a bilateral agreement of the resource provider and the consumer. Further, billing policies may generally reflect any number of considerations, including legal or contractual requirements, economic or business considerations, ease of implementation, management, or enforcement, etc.

For example, a first example billing policy might seek to maximize the resource provider's profits (i.e., the greatest cost for resources). Using the example shown in graph 480, if a consumer's excess resource usage required 4 µP-days capacity, the resource manager applying this first billing policy would prefer the "utility" cost scheme (which corresponds to 900 cost units) over the "on/off" cost scheme (800 cost units). The resource manager may consider this preference as definitive (i.e., the resource manager will select the computing system corresponding to the greatest cost), or may use this preference to influence one or more factors in selecting a computing system.

A second example billing policy might instead seek to minimize costs to the consumer; for instance, a resource provider might select this policy to build goodwill with the consumer. Using the same example and the same 4 µP-days capacity, the resource manager would instead prefer the "on/off" cost scheme (800 cost units) to the "utility" cost scheme (900 cost units) when applying the second billing policy.

Other billing policies might seek to preserve a status quo for the resource provider and/or consumer. An example policy might seek to maintain the same type of capacity for the consumer; for example, if the consumer had previously purchased "on/off" capacity and then exceeded the purchased capacity, the resource manager would prefer computing systems having available "on/off" capacity to systems having other capacity types, even though the resource provider might profit more or otherwise benefit from applying a different cost scheme. Another example policy might seek to maintain approximately the same unit or total cost for capacity provided to the consumer.

In addition to applying and considering one or more billing policies when selecting a computing system or systems to provide pooled resources to a consumer, the resource manager may also monitor the cumulative costs associated with the amount of the consumer's excess resource usage. When the total cost exceeds a predefined threshold amount, the resource manager may then automatically deallocate the resources from the consumer back to the system pool (of course, consistent with any constraints and restraints, as described above). This threshold amount may be chosen according to any number of considerations, but in one embodiment may be chosen specifically to recover costs of the excess resource usage under the current cost scheme. In other words, the resource provider may seek to bill for costs that would have been incurred by the consumer, had the amount of excess resource usage been billed under the rate of the current cost scheme.

Using an example with graph 480, assume that the consumer purchased a fixed amount of "utility" capacity and exceeded the purchased limit by 2 µP-days (600 cost units). Assume further that a computing system was selected to provide "on/off" capacity to the consumer for the excess resource usage (at 200 cost units/µP-day). If the total cost threshold is set at the amount that the resource provider would have billed the consumer under the "utility" cost scheme (i.e., 600 cost units), the resource manager may allow continued billing of the consumer's excess resource usage up to 3 µP-days of "on/off" (also equaling 600 cost units) before deallocating the resources back to the system pool. In this way, the resource manager may recapture costs that the resource provider could have earned, but for the consumer purchasing an inadequate amount of capacity. This may be advantageous in particular for cost schemes generally having lower costs, or whose marginal costs decrease at greater capacity; in this situation, a consumer having purchased capacity at a relatively greater cost might seek to incur lower total costs by intentionally exceeding purchased capacity limits, or by exceeding the capacity limits in a greater amount.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A control arrangement for managing computing resources from a pool of a plurality of networked computing systems for use by one or more consumers, the control arrangement comprising:
    at least one hardware management controller coupled with the plurality of computing systems and comprising a processor; and
    a memory containing a program, which when executed by the processor, performs an operation, comprising:
        determining, using the processor, that resource usage of a consumer exceeds an initial amount of computing resources allocated to the consumer from one or more first computing systems from the pool, the initial amount of computing resources associated with a first cost scheme of a predetermined plurality of cost schemes;
        after an elapse of a predetermined period of time, and upon determining that the resource usage of the consumer continues to exceed the initial amount of allocated computing resources by an excess amount of resource usage:
            selecting, based on a predetermined billing policy and the excess amount of resource usage, a second cost scheme of the plurality of cost schemes to be applied to the excess amount of resource usage;
            identifying, using the processor, one or more second computing systems from the pool having capacity available under the second cost scheme to host at least a portion of the excess amount of resource usage, wherein identifying the one or more second computing systems comprises determining, for each computing system of the one or more second computing systems, one or more respective capacity types, each capacity type having a predetermined association with a respective cost scheme of the plurality of predetermined cost schemes, wherein the one or more second computing systems include a plurality of capacity types;
            determining, using the processor, a respective cost for each of the plurality of capacity types; and
            allocating an additional amount of computing resources from at least one selected second computing system to meet the excess amount of resource usage, wherein the at least one selected second computing system is selected based on the predetermined billing policy and a comparison of the determined respective costs, wherein the at least one selected second computing system is selected from the one or more second computing systems based on a determined value of disruption to resource availability for the consumer by hosting the portion of the excess amount of resource usage by the at least one selected second computing system;
        transferring at least the excess amount of resource usage from the one or more first computing systems to the at least one selected second computing system, wherein transferring at least the excess amount of resource usage comprises transmitting instructions from the at least one hardware management controller to one of (1) the one or more first computing systems and the at least one selected second computing system, and (2) one or more hypervisors associated with the one or more first computing systems and the at least one selected second computing system; and
        determining, based on an associated cost of the additional amount of computing resources, whether to deallocate the additional amount of computing resources to the pool, wherein the associated cost is determined under the first cost scheme and is expended based on the second cost scheme applied to the excess amount of resource usage.

2. The control arrangement of claim 1, wherein the at least one selected second computing system is selected further based on one or more of a resource continuity policy and a consumer-specified preference.

3. The control arrangement of claim 1, the operation further comprising:

determining an alternative cost of the excess amount of resource usage according to the first cost scheme; and deallocating the additional amount of computing resources from the at least one selected second computing system upon determining the associated cost of the additional amount according to the second cost scheme reaches the alternative cost.

4. The control arrangement of claim 3, wherein the first and second cost schemes are different.

5. The control arrangement of claim 1, wherein the excess amount of resource usage comprises one or more of processors and memory.

6. The control arrangement of claim 1, wherein the determined value of disruption is based on a corresponding number of computing systems included in the at least one selected second computing system, wherein fewer computing systems corresponds to a lesser value of disruption and a greater number of computing systems corresponds to a greater value of disruption.

7. The control arrangement of claim 1, wherein the determined value of disruption is based on a respective distance associated with each of the identified one or more second computing systems, wherein a lesser distance corresponds to a lesser value of disruption and a greater distance corresponds to a greater value of disruption.

8. A system, comprising:
a pool of one or more networked computing systems, each computing system configured to provide computing resources to one or more consumers; and
at least one hardware management controller coupled with the one or more networked computing systems and comprising a processor, and configured to:
determine, using the processor, that resource usage of a consumer exceeds an initial amount of computing resources allocated to the consumer from one or more first computing systems from the pool, the initial amount of computing resources associated with a first cost scheme of a predetermined plurality of cost schemes;
after an elapse of a predetermined period of time, and upon determining that the resource usage of the consumer continues to exceed the initial amount of allocated computing resources by an excess amount of resource usage:
select, based on a predetermined billing policy and the excess amount of resource usage, a second cost scheme of the plurality of cost schemes to be applied to the excess amount of resource usage;
identify, using the processor, one or more second computing systems from the pool having capacity available under the second cost scheme to host at least a portion of the excess amount of resource usage, wherein identifying the one or more second computing systems comprises determining, for each computing system of the one or more second computing systems, one or more respective capacity types, each capacity type having a predetermined association with a respective cost scheme of the plurality of predetermined cost schemes, wherein the one or more second computing systems include a plurality of capacity types;
determining, using the processor, a respective cost for each of the plurality of capacity types; and
allocate an additional amount of computing resources from at least one selected second computing system to meet the excess amount of resource usage, wherein the at least one selected second computing system is selected based on the predetermined billing policy and a comparison of the determined respective costs, wherein the at least one selected second computing system is selected from the one or more second computing systems based on a determined value of disruption to resource availability for the consumer by hosting the portion of the excess amount of resource usage by the at least one selected second computing system;
transfer at least the excess amount of resource usage from the one or more first computing systems to the at least one selected second computing system, wherein transferring at least the excess amount of resource usage comprises transmitting instructions from the at least one hardware management controller to one of (1) the one or more first computing systems and the at least one selected second computing system, and (2) one or more hypervisors associated with the one or more first computing systems and the at least one selected second computing system; and
determine, based on an associated cost of the additional amount of computing resources, whether to deallocate the additional amount of computing resources to the pool, wherein the associated cost is determined under the first cost scheme and is expended based on the second cost scheme applied to the excess amount of resource usage.

9. The system of claim 8, wherein the at least one selected second computing system is selected further based on one or more of a resource continuity policy and a consumer-specified preference.

10. The system of claim 8, wherein the hardware management controller is further configured to:
determine an alternative cost of the excess amount of resource usage according to the first cost scheme; and
deallocate the additional amount of computing resources from the at least one selected second computing system upon determining the associated cost of the additional amount of computing resources according to the second cost scheme reaches the alternative cost.

11. The system of claim 10, wherein the first and second cost schemes are different.

12. The system of claim 8, wherein the excess amount of resource usage comprises one or more of processors and memory.

13. The system of claim 8, wherein the determined value of disruption is based on a corresponding number of computing systems included in the at least one selected second computing system, wherein fewer computing systems corresponds to a lesser value of disruption and a greater number of computing systems corresponds to a greater value of disruption.

14. The system of claim 8, wherein the determined value of disruption is based on a respective distance associated with each of the identified one or more second computing systems, wherein a lesser distance corresponds to a lesser value of disruption disruption and a greater distance corresponds to a greater value of disruption.

* * * * *